US008666198B2

(12) United States Patent
Shochat et al.

(10) Patent No.: US 8,666,198 B2
(45) Date of Patent: Mar. 4, 2014

(54) RELATIONSHIP MAPPING EMPLOYING MULTI-DIMENSIONAL CONTEXT INCLUDING FACIAL RECOGNITION

(75) Inventors: Eden Shochat, Herzilia (IL); Moti Shniberg, New York, NY (US); Gil Hirsch, Lapid (IL); Yaniv Taigman, Ra'anana (IL)

(73) Assignee: Facebook, Inc., Menlo Park, CA (US)

( * ) Notice: Subject to any disclaimer, the term of this patent is extended or adjusted under 35 U.S.C. 154(b) by 578 days.

(21) Appl. No.: 12/922,984

(22) PCT Filed: Mar. 19, 2009

(86) PCT No.: PCT/IL2009/000316
§ 371 (c)(1),
(2), (4) Date: Feb. 15, 2011

(87) PCT Pub. No.: WO2009/116049
PCT Pub. Date: Sep. 24, 2009

(65) Prior Publication Data
US 2011/0182485 A1    Jul. 28, 2011

Related U.S. Application Data

(60) Provisional application No. 61/070,377, filed on Mar. 20, 2008.

(51) Int. Cl.
*G06K 9/60*    (2006.01)

(52) U.S. Cl.
USPC .......................................... 382/305; 382/118

(58) Field of Classification Search
USPC ....................................................... 382/305
See application file for complete search history.

(56) References Cited

U.S. PATENT DOCUMENTS

| 5,164,992 | A | 11/1992 | Turk et al. |
| 5,963,670 | A | 10/1999 | Lipson et al. |
| 6,035,055 | A | 3/2000 | Wang et al. |
| 6,292,575 | B1 | 9/2001 | Bortolussi et al. |
| 6,819,783 | B2 | 11/2004 | Goldberg et al. |
| 6,944,319 | B1 | 9/2005 | Huang et al. |
| 6,990,217 | B1 | 1/2006 | Moghaddam et al. |

(Continued)

FOREIGN PATENT DOCUMENTS

WO    2009/116049 A2    9/2009

OTHER PUBLICATIONS

Mor Naaman et al, Leveraging Context to Resolve Identity in Photo Albums, JCDL 2005.*

(Continued)

*Primary Examiner* — Chan S Park
*Assistant Examiner* — Mark Roz
(74) *Attorney, Agent, or Firm* — Baker Botts L.L.P.

(57) ABSTRACT

A system and method for mapping interpersonal relationships, the method including processing a multiplicity of images and contextual information relating thereto including creating and prioritizing a list of a plurality of candidate persons having at least a predetermined relationship with at least one person connected to at least one image, using multi-dimensional information including visually sensible information in the multiplicity of images and contextual information relating thereto and searching the list of a plurality of candidate persons based at least in part on the prioritizing to select at least one of the candidate persons as having at least a predetermined relationship with the at least one person.

70 Claims, 3 Drawing Sheets

(56) References Cited

U.S. PATENT DOCUMENTS

| | | | |
|---|---|---|---|
| 7,274,822 | B2 | 9/2007 | Zhang et al. |
| 7,295,687 | B2 | 11/2007 | Kee et al. |
| 2006/0253491 | A1 | 11/2006 | Gokturk et al. |
| 2007/0076922 | A1 | 4/2007 | Living et al. |
| 2007/0237355 | A1 | 10/2007 | Song et al. |
| 2008/0049976 | A1 | 2/2008 | Isomura et al. |

OTHER PUBLICATIONS

Lei Zhang et al, Efficient Propagation for Face Annotation in Family Albums, ACM 2004.*

Zak Stone, et al., "*Toward Large-Scale Face Recognition Using Social Network Context*," Proceedings of the IEEE, vol. 98, No. 8; 8 pgs, Aug. 2010.

Zak Stone, et al, "*Autotagging Facebook: Social Network Context Improves Photo Annotation*," Paper presented at the IEEE Computer Society Conference on Computer Vision and Pattern Recognition Workshops, Anchorage, AK. 8 pgs, Jun. 2008.

U.S. Appl. No. 13/906,148, filed May 30, 2013, Barak.

International Preliminary Examination Report dated Sep. 30, 2010 issued during prosecution of PCT/IL09/00316.

International Search Report dated Jul. 17, 2009 issued during prosecution of PCT/IL09/00316.

* cited by examiner

FIG. 1A

XML DATA:
PICTURE TAKEN BY GREG

FIG. 1B

XML DATA:
PICTURE UPLOADED BY JOHN

RELATIONSHIP MAPPING EMPLOYING MULTI-DIMENSIONAL CONTEXT INCLUDING FACIAL RECOGNITION

REFERENCE TO RELATED APPLICATIONS

Reference is made to U.S. Provisional Patent Application Ser. No. 61/070,377, filed Mar. 20, 2008 and entitled: Social and Contextual-Based Facial Recognition, the disclosure of which is hereby incorporated by reference and priority of which is hereby claimed under 37 CFR 1.78(a)(4) and (5)(i).

FIELD OF THE INVENTION

The present invention relates to systems and methods for mapping interpersonal relationships.

BACKGROUND OF THE INVENTION

The following publications are believed to represent the current state of the art:

U.S. Pat. Nos. 5,164,992; 5,963,670; 6,292,575; 6,819,783; 6,944,319; 6,990,217; 7,274,822 and 7,295,687; and U.S. Published Patent Application Nos.: 2006/0253491 and 2007/0237355.

SUMMARY OF THE INVENTION

The present invention seeks to provide an improved system for mapping interpersonal relationships. There is thus provided in accordance with a preferred embodiment of the present invention a method for mapping interpersonal relationships including processing a multiplicity of images and contextual information relating thereto including creating and prioritizing a list of a plurality of candidate persons having at least a predetermined relationship with at least one person connected to at least one image, using multi-dimensional information including visually sensible information in the multiplicity of images and contextual information relating thereto and searching the list of a plurality of candidate persons based at least in part on the prioritizing to select at least one of the candidate persons as having at least a predetermined relationship with the at least one person.

There is additionally provided in accordance with a preferred embodiment of the present invention a system for mapping interpersonal relationships including processing functionality operative to process a multiplicity of images and contextual information relating thereto including creating and prioritizing a list of a plurality of candidate persons having at least a predetermined relationship with at least one person connected to at least one image, using multi-dimensional information including visually sensible information in the multiplicity of images and contextual information relating thereto and searching functionality operative to search the list of a plurality of candidate persons based at least in part on the prioritizing to select at least one of the candidate persons as having at least a predetermined relationship with the at least one person.

Preferably, the searching also employs the multi-dimensional information.

In accordance with a preferred embodiment of the present invention, the multi-dimensional information includes at least one of visual information appearing in an image, geographical information appearing in the image, visual background information appearing in the image, images of other persons appearing in the image and person identifiers appearing in the image and at least one of information relating to an image collection of which the image forms a part, a time stamp associated with the image, information not appearing in the image but associated therewith, geographical information not appearing in the image, visual background information appearing in another image and person identifiers not appearing in the image but otherwise associated therewith.

More preferably, the multi-dimensional information includes at least one of visual information appearing in an image, geographical information appearing in the image, visual background information appearing in the image, images of other persons appearing in the image and person identifiers appearing in the image and at least two of information relating to an image collection of which the image forms a part, a time stamp associated with the image, information not appearing in the image but associated therewith, geographical information not appearing in the image, visual background information appearing in another image and person identifiers not appearing in the image but otherwise associated therewith.

Even more preferably, the multi-dimensional information includes at least one of visual information appearing in an image, geographical information appearing in the image, visual background information appearing in the image, images of other persons appearing in the image and person identifiers appearing in the image and at least three of information relating to an image collection of which the image forms a part, a time stamp associated with the image, information not appearing in the image but associated therewith, geographical information not appearing in the image, visual background information appearing in another image and person identifiers not appearing in the image but otherwise associated therewith.

Most preferably, the multi-dimensional information includes all of the following: visual information appearing in an image, geographical information appearing in the image, visual background information appearing in the image, images of other persons appearing in the image; person identifiers appearing in the image, information relating to an image collection of which the image forms a part, a time stamp associated with the image, information not appearing in the image but associated therewith, geographical information not appearing in the image, visual background information appearing in another image and person identifiers not appearing in the image but otherwise associated therewith.

In accordance with a preferred embodiment of the present invention, the at least one image is a composite image, which includes images of multiple persons, at least one of whom is unknown. Alternatively, the at least one image is a composite image, which includes images of multiple persons, none of whom are known.

Preferably, the at least one person connected with the at least one image appears in the image.

In accordance with a preferred embodiment of the present invention, the method also includes tagging the at least one person connected with the at least one image with a person identifier. Additionally or alternatively, the processing includes iterative generation of relationship maps based on at least visually sensible information and also on additional, non-visually sensible information related to persons who either appear in the at least one image or are otherwise associated therewith.

Preferably, the non-visually sensible information is meta-data associated with image data. Additionally, the meta-data includes data derived from a social network. Alternatively or additionally, the meta-data includes data attached to the image data of the composite image.

In accordance with a preferred embodiment of the present invention, the iterative generation of relationship maps starts from a precursor relationship map, containing information on relationships of at least one known person in the at least one image.

Preferably, the relationship map is also based on interpersonal relationship data received from at least one of a social network and earlier instances of relationship mapping based on analysis of other images. Additionally or alternatively, the relationship map includes an indication of at least strength of the relationship between two persons. Alternatively or additionally, the relationship map includes a face representation which identifies each of the persons in the map.

In accordance with a preferred embodiment of the present invention, the relationship map includes an indication of whether each person in the map is a male or female. Additionally, the indication of whether each person in the map is a male or female is provided by at least one of a social network and operation of image attribute recognition.

Preferably, the prioritizing employs an indication of whether a person is a male or female. Additionally or alternatively, the prioritizing employs an indication of whether a person appears in the same album in a social network as another person appears.

In accordance with a preferred embodiment of the present invention, the processing includes seeking candidate persons having at least a predetermined relationship with a known person in at least one image. Additionally, the seeking candidate persons is carried out by starting with the generation of a list of candidate persons who have a temporal association with the known person based on visually-sensible information contained in the at least one image as well as non-visually sensible information. Additionally, the non-visually sensible information includes at least one of the time and geographical location where the composite image was taken and an identification of an album on a social network with which it is associated. Additionally or alternatively, the non-visually sensible information is obtained at least by interfacing with social network APIs to find persons who appeared in other pictures in the same album, or persons that appeared in other albums taken in the same geographical location at the same time.

Preferably, the list of candidate persons is extended and further prioritized by analyzing relationships of the persons appearing in a relationship map. In accordance with a preferred embodiment of the present invention, the prioritizing employs image attribute filtering.

In accordance with a preferred embodiment of the present invention, the processing includes facial representation generation performed on an unknown person in at least one image. Additionally, the method also includes comparing the facial representation with previously generated facial representations of the candidate persons in accordance with and in an order established by the prioritizing. Preferably, the comparing is terminated and a candidate person is selected when a combined priority/similarity threshold is reached for a given candidate person, the priority/similarity threshold taking into account the similarity of a facial representation of a candidate person to the facial representation of an unknown person, the priority of that candidate person established by the above-referenced prioritizing and the quality of the facial representation of the candidate person.

Preferably, user feedback confirming that the person whose image is believed to be a given person is or is not that person is employed in generation of a further iterative relationship map. Alternatively, user feedback confirming that the person whose image is believed to be a given person is or is not that person is employed in improving the face representation.

In accordance with a preferred embodiment of the present invention, the searching includes comparison of face representations of persons in the list of candidate persons with face representations of persons in the relationship map.

In accordance with a preferred embodiment of the present invention, the method also includes searching at least one of the relationship maps. Additionally, the searching of the at least one of the relationship maps employs search terms including at least one of uniquely identified persons, an additional image of a person, relationships between various persons, gender and face representations. Alternatively or additionally, the searching of the at least one of the relationship maps employs a user interface. Additionally or alternatively, the searching of the at least one of the relationship maps is carried out via at least one social network having access to the at least one of the relationship maps.

BRIEF DESCRIPTION OF THE DRAWINGS

The present invention will be more fully understood and appreciated from the following detailed description, taken in conjunction with the drawings in which.

DETAILED DESCRIPTION OF PREFERRED EMBODIMENTS

Figure 1A:
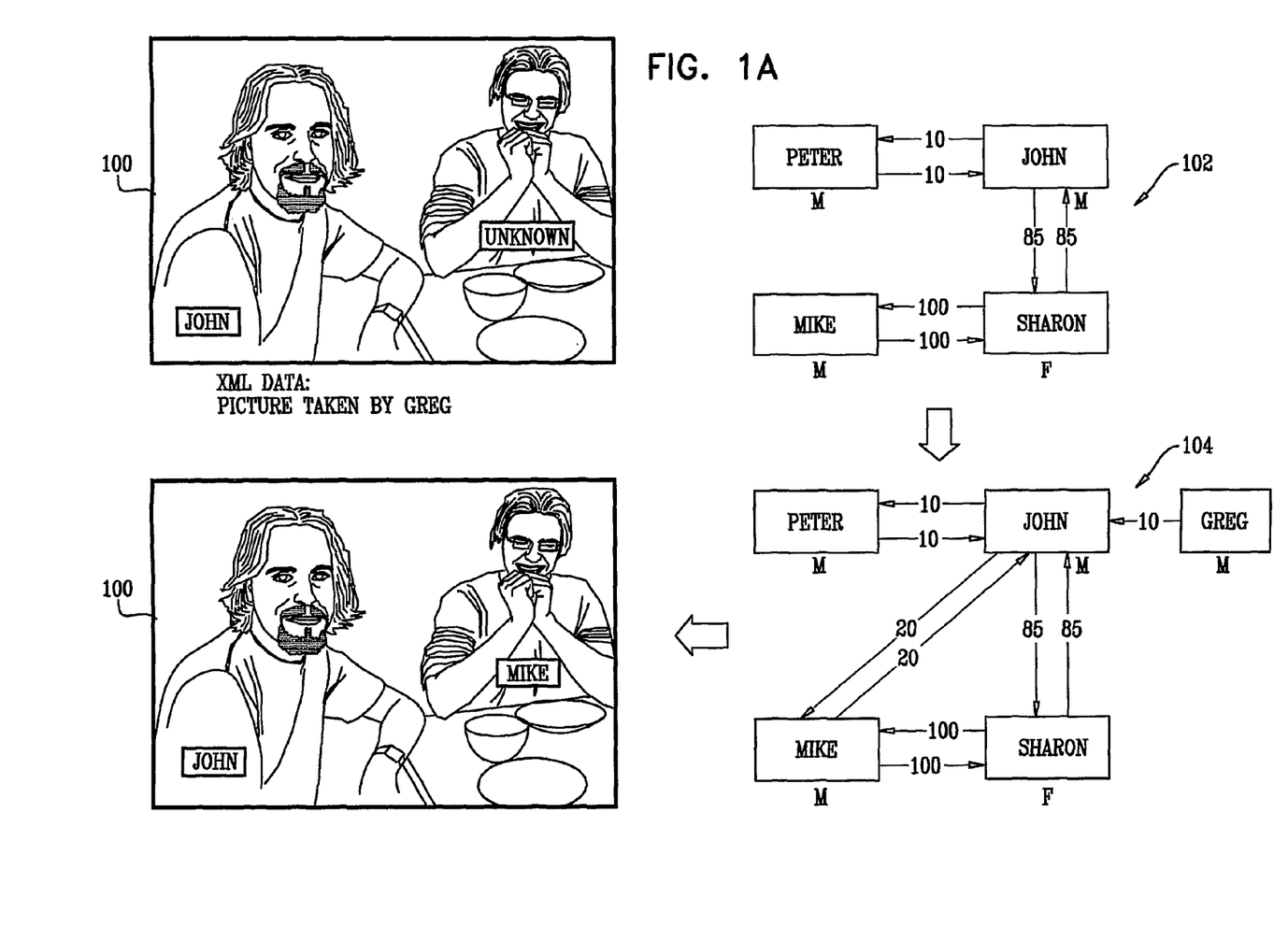
FIGS. 1A and 1B are together a simplified generalized illustration of relationship mapping functionality, employing multi-dimensional context, including facial recognition, operative in accordance with a preferred embodiment of the present invention.

Reference is now made to FIG. 1A, which is a simplified generalized illustration of relationship mapping functionality employing multi-dimensional context, including facial recognition, operative in accordance with a preferred embodiment of the present invention. Facial recognition preferably includes facial representation generation and subsequent comparison of multiple facial representations.

The functionality may be understood and visualized by starting with a composite image, represented by a line drawing 100, which includes images of multiple people, at least one of whom is known. In the present example, exemplified by line drawing 100, one person, here labeled John, is known and a second person, here labeled Unknown, is not known. In this example, the person who took the picture represented by line drawing 100 is also known.

In accordance with a preferred embodiment of the invention in order to identify an unknown person, an iterative relationship map is generated based inter alia on visually sensible information contained in the composite image represented by line drawing 100 and also on additional, non-visually sensible information related to the above-mentioned persons who either appear in the composite image or are otherwise associated therewith. In a preferred embodiment, the non-visually sensible information may be meta-data attached to or associated with image data. The image data typically includes images in JPEG or PNG format. The meta-data may be data in XML or other suitable formats derived from a social network, such as FACEBOOK®, MYSPACE® AND FLICKR® as well as data conventionally attached to image data, such as XML, EXIF tag or other standard image contextual data. Typically, in the present example, John and Peter are uniquely known on a social network. The person who took the picture containing the composite image represented by line drawing 100 is identified as Greg, preferably by XML data attached to the image data of the composite image represented by line drawing 100.

Generation of the relationship map preferably starts from a pre-existing iterative relationship map, here termed a precursor relationship map, represented by a diagram 102, containing information on relationships of a known person or known persons in the composite image, in this case John. The precursor relationship map is also based on the inter-personal relationship data received from one or more social networks as well as inter-personal relationship data derived from earlier instances of operation of the relationship mapping functionality of the present invention based on analysis of other composite images.

Diagram 102 indicates that John, a male, is known to have a social relationship with Sharon, a female, who in turn has a social relationship with Mike, a male. John also has a social relationship with Peter, a male. The symbology employed in the relationship map indicates various parameters, including strength of the relationship between two persons. In the present example, a number inserted in a relationship indicating arrow indicates the strength of the relationship in the direction indicated by the arrow. The higher the number, the stronger the relationship in the illustrated example.

In the example of diagram 102, the relationship between John and Mike is expected to be relatively strong, by virtue of the relationship between John and Sharon (85) and the relationship between Sharon and Mike (100), notwithstanding that it is an indirect relationship, through Sharon. This strength may be evidenced by multiple composite images in which Sharon appears with Mike and separately with John. The relationship between John and Peter is indicated, by the number 10, to be relatively weak, notwithstanding that it is a direct relationship. For example John and Peter may both appear together only in one composite image and that image may include many other people.

The precursor relationship map also includes a face representation produced by conventional facial representation generation techniques, such as techniques described in either or both of U.S. Pat. No. 5,164,992, entitled "Face recognition system" and U.S. Pat. No. 6,292,575, entitled "Real-time facial recognition and verification system". The face representation is typically in the form of a vector, which identifies each of the persons in the map.

The precursor relationship map also includes an indication of whether each person in the map is a male or female, indicated by the letters M and F. This indication may be provided by various sources, such as a social network or by operation of image attribute recognition, which may be entirely conventional, such as described in U.S. Pat. No. 6,990,217 entitled: "Gender classification with support vector machines". Additional attributes may be generated by image attribute recognition and can be included within the precursor relationship map. These may include complexion, eye color and hair color. Conventional image attribute recognition is known to have accuracy of above 90% in determining gender.

The precursor relationship map and subsequent relationship maps preferably also include information from visual background analysis.

Generation of the relationship map employs information from the composite image represented by line drawing 100, such as that John appears in the composite image together with an unknown individual. Image attribute analysis is preferably applied to the composite image represented by line drawing 100, in order to determine whether the unknown individual is a male or a female.

In accordance with a preferred embodiment of the present invention, candidate persons having at least a predetermined relationship with the known person, John, in the composite image are sought. This is preferably done by starting with the generation of a list of candidate persons who have a temporal association with the known person based on visually-sensible information contained in the composite image as well as the non-visually sensible information typically available as meta-data.

Such non-visually sensible information may include the time and geographical location where a picture was taken and the album on a social network with which it is associated. For example, by interfacing with social network APIs, queries can be made to find persons who appeared in other pictures in the same album, or persons that appeared in other albums taken in the same geographical location at the same time. These persons would typically be on an initial list of candidate persons.

In accordance with a preferred embodiment of the present invention, the list of candidate persons is extended and further prioritized by analyzing relationships of the persons appearing in the precursor relationship map. In practice, the precursor relationship map may include millions of people. It is a particular feature of the present invention that prioritization of the persons appearing in the precursor relationship map is carried out. This prioritization preferably includes image attribute filtering, which eliminates persons who are of a gender other than the gender of the unknown person in the composite image. For example, referring to diagram 102, the persons appearing are Mike and Sharon. Image attribute filtering is used to eliminate Sharon, since, image attribute recognition indicates that the unknown person in the composite image represented by line drawing 100 is a male.

The prioritization preferably relies heavily on the strengths of relationships between the known person and various other persons in the precursor relationship map and gives much higher priority to persons having the strongest relationship with the known person. Thus in the present example, Mike is prioritized over Peter. The prioritization is given expression in operation of the functionality of the present invention preferably by initially performing facial recognition on the images of persons having highest priority. Thus, when the pool of candidates includes millions of people, the prioritization which is a particular feature of the present invention, is of great importance.

Facial representation generation, which may be entirely conventional, is performed on the unknown person in the composite image represented by line drawing 100. The resulting facial representation is compared with previously generated facial representations of the candidate persons in accordance with and in the order established by the above-described prioritization. The result of the comparison is a metric depicting the similarity between the two different facial representations. The comparison is cut off and a candidate is selected when a combined priority/similarity threshold is reached for a given candidate person.

The priority/similarity threshold takes into account the similarity of a facial representation of a candidate person to the facial representation of the unknown person, the priority of that candidate person established by the above-referenced prioritization and a metric which indicates the quality of the facial representation of the candidate person. This metric is a function of various parameters, such as the number of images of that person that have been analyzed by the system and previous user feedback. A preferred quality metric, Qi, is given by the following expression:

$$Qi = \left[\left[1-\left(\frac{1}{n}\right)^2\right] \times q\right] \times \left[\frac{tp}{fp} \times \left(\frac{1}{fn}\right)^2\right]$$

where n is the count of images including the face representation, fp is the percent of false positives indicated so far by user feedback, tp is the percent of true positives indicated so far by user feedback, fn is the percent of false negatives indicated so far by user feedback and q is a weighting of variance of the vectors representing the images that compose the face representation.

The match between the unknown person and the selected candidate person is then employed to provide an initial revised relationship map, indicated by a diagram 104. In the illustrated example, the unknown person is tentatively identified as Mike and the relationship between Mike and John is initially indicated as being a relatively weak relationship. It is noted that Greg also appears in diagram 104 as having a weak one-directional relationship with John, based on Greg having taken the photograph containing the composite image represented by line drawing 100.

If any positive user feedback is received via a social network confirming that the person whose image is believed to be Mike is indeed Mike, this feedback is used to strengthen the relationship between Mike and John as expressed in a subsequent revised relationship map, not shown, and to strengthen the metric which indicates the quality of the facial representation of Mike. Conversely, receipt of negative feedback indicating that the person whose image is believed to be Mike is not Mike weakens the relationship between Mike and John as expressed in a subsequent revised relationship map, not shown, and weakens the metric which indicates the quality of the facial representation of Mike. Additionally it serves as a negative example for future facial representation comparison.

Figure 1B:
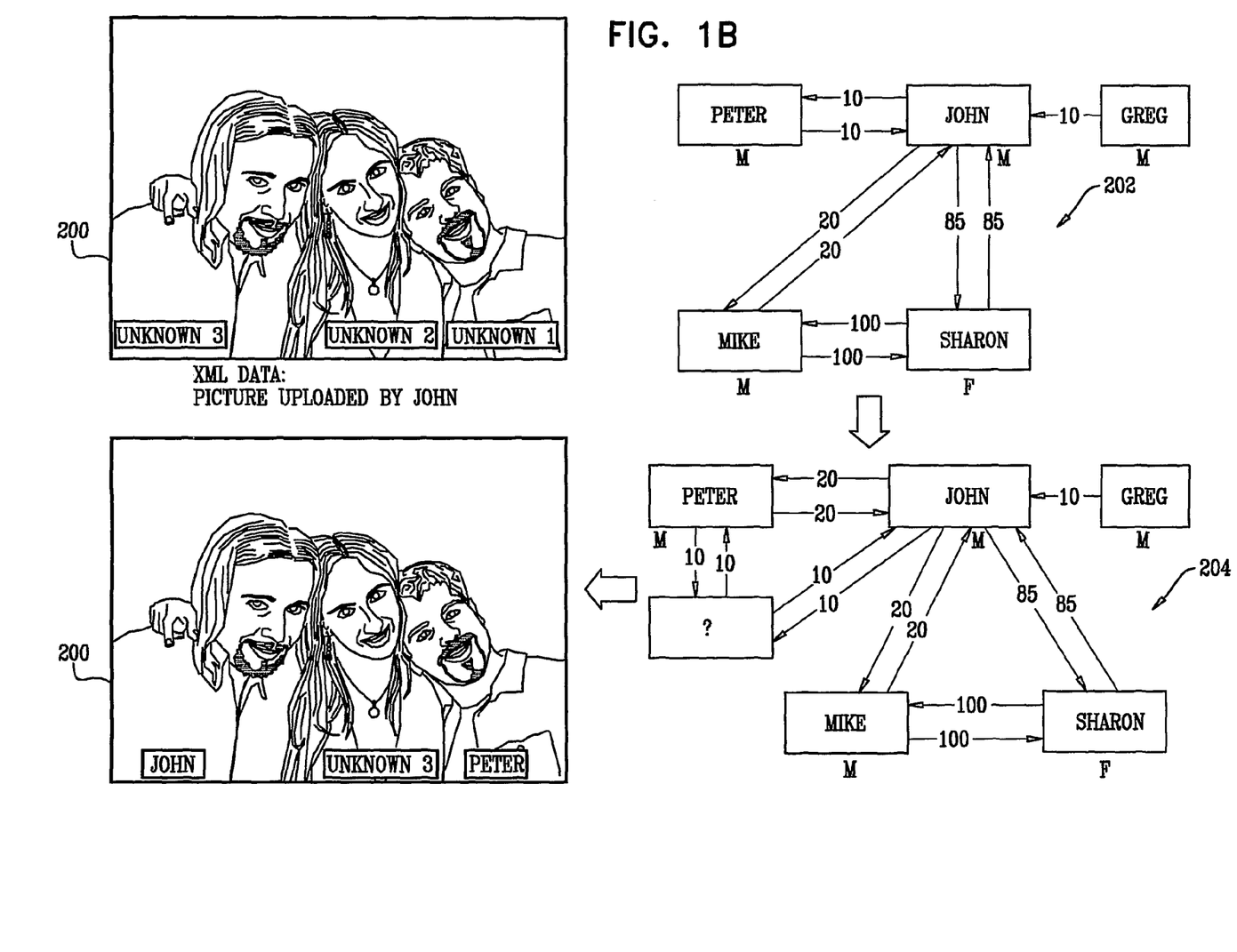

Reference is now made to FIG. 1B, which is another simplified generalized illustration of relationship mapping functionality employing multi-dimensional context, including facial recognition, operative in accordance with a preferred embodiment of the present invention.

The functionality may be understood and visualized by starting with a composite image, represented by a line drawing 200, which includes images of multiple people. In the present example, exemplified by line drawing 200, three persons here labeled Unknown 1, Unknown 2 and Unknown 3, appear. All are not known. In this example, the person who uploaded the picture to the social network site represented by line drawing 200 is known to be the abovementioned John. Identification of the unknown persons preferably employs relationship mapping.

Generation of a relationship map preferably begins from a pre-existing iterative relationship map, for example a precursor relationship map, represented by a diagram 202, which is identical to diagram 104. This precursor relationship map contains information on relationships of a known person or known persons in the previously analyzed composite image, in this case John, Peter, Greg and Sharon. This information is based on the inter-personal relationship data received from one or more social networks as well as inter-personal relationship data derived from the earlier instance of operation of the relationship mapping functionality of the present invention based on analysis of other composite images.

Diagram 202 indicates that John, a male, is known to have a strong social relationship with Sharon, a female, who in turn has a strong social relationship with Mike, a male. John is also indicated to have weak social relationships with Peter, Greg and Mike, who are males.

In accordance with a preferred embodiment of the present invention, candidate persons having at least a predetermined relationship with the known person, John, who uploaded the picture represented by line drawing 200, are sought. This is preferably done by starting with the persons appearing in the precursor relationship map 202. As noted above, it is a particular feature of the present invention that prioritization of the persons appearing in the precursor relationship map is carried out.

The prioritization preferably relies heavily on the strength of the relationship between the known person, John, and other persons in the relationship map 202 and gives much higher priority to persons having the strongest relationship with the known person, John. Thus in the present example, John is prioritized above all, as having the strongest relationship to himself. After John, Mike has the next highest priority, since Sharon is eliminated by her gender.

After Mike, Peter has a higher priority than Greg, notwithstanding that both of their relationship arrows are given the same numerical score, since the relationship between John and Greg is only known to be unidirectional.

Prioritization preferably is also based on a certainty metric. In this case, the certainty that John is one of the unknown persons in the composite image 200 initially is not particularly high. In view of this, a prioritization cut-off is implemented, such that Peter and Greg, who have relatively weak relationships with John, are not considered to be candidates. As noted above, prioritization is given expression in operation of the functionality of the present invention preferably by initially performing facial recognition on the persons having highest priority, starting with John.

Facial representation generation is performed on the unknown persons in the composite image represented by line drawing 200. The resulting facial representation is compared with previously generated facial representations of the candidate persons in accordance with and in the order established by the above-described prioritization.

For example, facial representation generation is performed on the three unknown images within composite image represented by a line drawing 200. Thereafter comparison of the facial representations of the three unknown persons is carried out in accordance with the prioritized list generated above. The priority/similarity threshold for each is evaluated, and thus Unknown 1 is recognized as John, Unknown 2 and Unknown 3 are yet to be recognized.

In accordance with a preferred embodiment of the present invention, following recognition of Unknown 1 as John, in order to recognize the remaining unknown persons in the composite image, an additional prioritization iteration is carried out. In this additional prioritization iteration, the identification of Unknown 1 as John increases the certainty metric for persons known to have a relationship with John and thus Peter is considered to be a candidate. Greg is still typically not considered to be a candidate since his relationship with John is unidirectional. Mike is typically not considered again inasmuch as a previous comparison of Mike with the generated unknown face representation generated a low similarity metric.

A new priority list includes Peter, based on his relationship with John, who is now known to be previously Unknown 1 in the composite image represented by line drawing 200.

Facial representations of the remaining unknown persons in the composite image represented by line drawing 200 are compared with previously generated facial representations of the candidate persons in accordance with and in the order established by the revised prioritization.

For example, Unknown 2 is recognized as Peter and Unknown 3 is yet to be recognized.

In accordance with a preferred embodiment of the present invention, following recognition of Unknown 2 as Peter, in order to recognize the last unknown person in the composite image, a further prioritization iteration is carried out. In this further prioritization iteration, the identification of Unknown 2 as Peter indicates that there are two starting points for generation, of candidate lists, John and Peter, both of whom are known to be in the composite image. Two candidate list subsets may thus be provided and used to generate a single prioritized list by using weighted graph combination techniques, as known in the art.

At this stage a further relationship map is generated, as indicated by reference numeral 204. In this relationship map, the indicated relationship between John and Peter is strengthened. Relationships between Unknown 3, John and Peter are also indicated based on the composite image represented by line drawing 200.

Unknown 3 may then be recognized in the future by comparing the facial representation of Unknown 3 with facial representations of persons who are subsequently indicated to have relationships with John or with the other persons appear in the relationship map 204.

Figure 2:
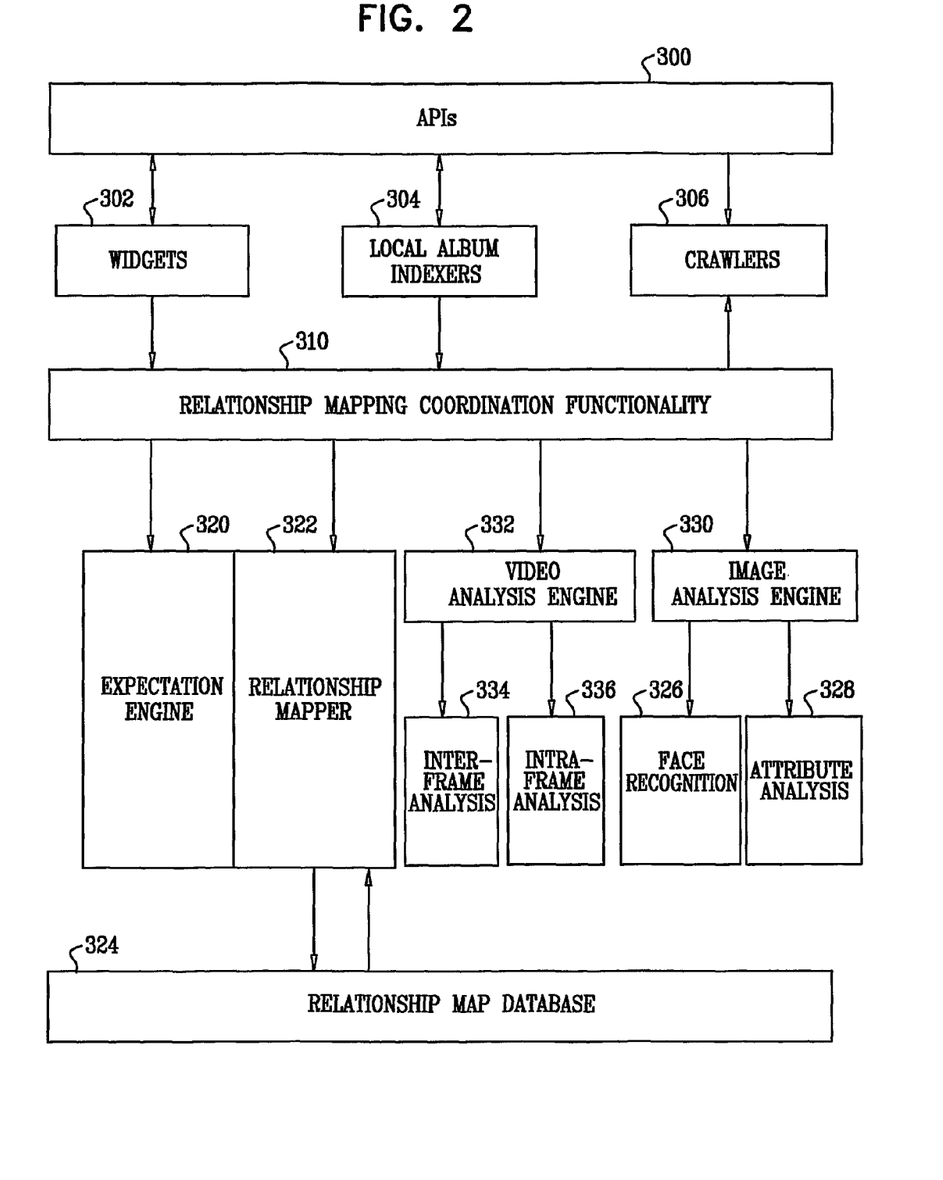
FIG. 2 is a simplified functional block diagram of a system for relationship mapping employing multi-dimensional context including facial recognition in accordance with a preferred embodiment of the present invention.

Reference is now made to FIG. 2, which is simplified functional block diagram of a system for relationship mapping employing multi-dimensional context including facial recognition in accordance with a preferred embodiment of the present invention. As seen in FIG. 2, the present invention utilizes one or more publicly available social network application program interfaces (APIs) 300, such as the APIs provided by FACEBOOK®, MYSPACE® AND FLICKR®. Examples of such APIs include the Facebook API, Facebook Connect, Picasa Web Albums Data API and the Flickr Services API.

The system communicates interactively with the APIs 300 via widgets 302 which may be embedded within applications such as FACEBOOK®, MYSPACE® AND FLICKR®, or standalone applications such as local album indexers 304. The system automatically receives updates from APIs 300 via crawlers 306, such as image crawlers, video crawlers and relationship crawlers, such as those used by spammers. Elements 302, 304 and 306 preferably include user interface functionality. The user interface functionality may be used to provide positive or negative feedback regarding whether a recognized person is indeed the named person. This feedback is communicated to relationship mapping coordination functionality 310 and used to strengthen or weaken the face representation. Additional user interface functionality includes search functionality operative to search the generated relationship map. Search terms include, for example, uniquely identified persons, an additional image of a person, relationships between various persons, other system generated attributes such as gender or facial representation resemblance and any suitable combination of the above. Search functionality can be provided directly via a user interface or indirectly by exposing the relationship mapper 322 information to social networks.

Standalone applications may include running on an end-user machine and performing some or all of the image attribute analysis, facial representation generation and facial representation comparison. In a preferred embodiment of the present invention, a local album indexer 304 performs image attribute analysis, facial representation generation and facial representation comparison operations, and communicates with the relationship mapping coordination functionality 310 to generate a unified facial representation from multiple images of a single person.

Relationship mapping coordination functionality is preferably responsive both to API sourced information from APIs 300 and to user inputs received via communicators such as widgets 302, local album indexers 304 and crawlers 306 and coordinates operation of the various elements of the system which are described hereinbelow.

The heart of the system of the present invention preferably includes an expectation engine 320 which interfaces with a relationship mapper 322, which in turn interfaces with a relationship map database 324. These elements utilize information obtained by functionality 310 from face recognition functionality 326 and attribute analysis functionality 328 via an image analysis engine 330. Preferably a video analysis engine 332 cooperates with interframe analysis functionality 334 and intraframe analysis functionality 336, which provide information based on temporal sequences of frames in video content.

Relationship mapper 322 functionality preferably include providing access to a weighted graph of strengths of the relationships between various uniquely identified persons. Each node in the graph represents a single person and includes a list of unique identifiers that can be one or more of an email address, an internet identifier like OpenID or a list of IDs of specific social networks. In addition, the node preferably contains a facial representation generated from one or more images of the person, his or her gender and other information relating to the person. The relationship map is stored at least partially in memory and is preferably available persistently via relationship database 324.

The expectation engine 320 preferably generates prioritized lists of candidate persons, listing persons expected to appear in a composite image, its associated data and social network data. Initially, the expectation engine queries the social networks via APIs 300 for a list of candidate persons having a temporal association with the known person based on visually-sensible information contained in the composite image as well as the non-visually sensible information typically available as meta-data.

Subsequently, the expectation engine functionality performs prioritization of the candidate persons expected to appear in the composite image by interfacing with relationship mapper 322 and by utilizing image attribute filtering provided by the image analysis engine 330. The prioritization preferably relies heavily on the strength of relationship between the known person and other persons in the relationship map and gives much higher priority to persons having the strongest relationship with the known person. In a preferred embodiment, the expectation engine combines the weighted graphs associated with known persons in the composite image, as provided by relationship mapper 322 by utilizing weighted graph combination algorithms.

It will be appreciated by persons skilled in the art that the present invention is not limited to what has been particularly shown and described hereinabove. Rather, the scope of the invention includes both combinations and sub-combinations of various features described hereinabove as well as modifications and variations thereof which would occur to a person skilled in the art upon reading the foregoing description and which are not in the prior art.

The invention claimed is:

1. A method for mapping interpersonal relationships comprising:
processing a multiplicity of images and contextual information relating thereto including creating and prioritizing a list of a plurality of candidate persons having at least a predetermined relationship with at least one person connected to at least one image, using multi-dimensional information including visually sensible information in said multiplicity of images and contextual information relating thereto, wherein said processing includes facial representation generation performed on an unknown person in at least one image;
searching said list of a plurality of candidate persons based at least in part on said prioritizing to select at least one of said candidate persons as having at least a predetermined relationship with said at least one person; and
comparing said facial representation with previously generated facial representations of the candidate persons in accordance with and in an order established by said prioritizing, wherein said comparing is terminated and a candidate person is selected when a combined priority/similarity threshold is reached for a given candidate person, said priority/similarity threshold taking into account the similarity of a facial representation of a candidate person to the facial representation of an unknown person, the priority of that candidate person established by the above-referenced prioritizing and the quality of the facial representation of the candidate person.

2. A method for mapping interpersonal relationships according to claim 1 and wherein said searching also employs said multi-dimensional information.

3. A method for mapping interpersonal relationships according to claim 1 and wherein said multi-dimensional information includes:
at least one of
visual information appearing in an image; geographical information appearing in said image; visual background information appearing in said image; images of other persons appearing in said image; and person identifiers appearing in said image; and
at least one of
information relating to an image collection of which said image forms a part;
a time stamp associated with said image;
information not appearing in said image but associated therewith;
geographical information not appearing in said image;
visual background information appearing in another image; and
person identifiers not appearing in said image but otherwise associated therewith.

4. A method for mapping interpersonal relationships according to claim 1 and wherein said multi-dimensional information includes:
at least one of
visual information appearing in an image; geographical information appearing in said image; visual background information appearing in said image; images of other persons appearing in said image; and person identifiers appearing in said image; and
at least two of
information relating to an image collection of which said image forms a part;
a time stamp associated with said image;
information not appearing in said image but associated therewith;
geographical information not appearing in said image;
visual background information appearing in another image; and
person identifiers not appearing in said image but otherwise associated therewith.

5. A method for mapping interpersonal relationships according to claim 1 and wherein said multi-dimensional information includes:
at least one of
visual information appearing in an image; geographical information appearing in said image; visual background information appearing in said image; images of other persons appearing in said image; and person identifiers appearing in said image; and
at least three of
information relating to an image collection of which said image forms a part;
a time stamp associated with said image;
information not appearing in said image but associated therewith;
geographical information not appearing in said image;
visual background information appearing in another image; and
person identifiers not appearing in said image but otherwise associated therewith.

6. A method for mapping interpersonal relationships according to claim 1 and wherein said multi-dimensional information includes:
all of the following:
visual information appearing in an image; geographical information appearing in said image; visual background information appearing in said image; images of other persons appearing in said image;
person identifiers appearing in said image;
information relating to an image collection of which said image forms a part;
a time stamp associated with said image;
information not appearing in said image but associated therewith;
geographical information not appearing in said image;
visual background information appearing in another image; and
person identifiers not appearing in said image but otherwise associated therewith.

7. A method for mapping interpersonal relationships according to claim 1 and wherein said at least one image is a composite image, which includes images of multiple persons, at least one of whom is unknown.

8. A method for mapping interpersonal relationships according to claim 1 and wherein said at least one image is a composite image, which includes images of multiple persons, none of whom are known.

9. A method for mapping interpersonal relationships according to claim 1 and wherein said at least one person connected with said at least one image appears in said image.

10. A method for mapping interpersonal relationships according to claim 1 and also comprising tagging said at least one person connected with said at least one image with a person identifier.

11. A method for mapping interpersonal relationships according to claim 1 and wherein said processing includes iterative generation of relationship maps based on at least visually sensible information and also on additional, non-visually sensible information related to persons who either appear in said at least one image or are otherwise associated therewith.

12. A method for mapping interpersonal relationships according to claim 1 and wherein said non-visually sensible information is meta-data associated with image data.

13. A method for mapping interpersonal relationships according to claim 12 and wherein said meta-data includes data derived from a social network.

14. A method for mapping interpersonal relationships according to claim 12 and wherein said meta-data includes data attached to the image data of said composite image.

15. A method for mapping interpersonal relationships according to claim 11 and wherein said iterative generation of relationship maps starts from a precursor relationship map, containing information on relationships of at least one known person in said at least one image.

16. A method for mapping interpersonal relationships according to claim 11 and wherein said relationship map is also based on inter-personal relationship data received from at least one of a social network and earlier instances of relationship mapping based on analysis of other images.

17. A method for mapping interpersonal relationships according to claim 11 and wherein said relationship map includes an indication of at least strength of the relationship between two persons.

18. A method for mapping interpersonal relationships according to claim 11 and wherein said relationship map includes a face representation which identifies each of the persons in the map.

19. A method for mapping interpersonal relationships according to claim 11 and wherein said relationship map includes an indication of whether each person in the map is a male or female.

20. A method for mapping interpersonal relationships according to claim 19 and wherein said indication of whether each person in the map is a male or female is provided by at least one of a social network and operation of image attribute recognition.

21. A method for mapping interpersonal relationships according to claim 1 and wherein said prioritizing employs an indication of whether a person is a male or female.

22. A method for mapping interpersonal relationships according to claim 1 and wherein said prioritizing employs an indication of whether a person appears in the same album in a social network as another person appears.

23. A method for mapping interpersonal relationships according to claim 1 and wherein said processing includes seeking candidate persons having at least a predetermined relationship with a known person in at least one image.

24. A method for mapping interpersonal relationships according to claim 23 and wherein said seeking candidate persons is carried out by starting with the generation of a list of candidate persons who have a temporal association with said known person based on visually-sensible information contained in said at least one image as well as non-visually sensible information.

25. A method for mapping interpersonal relationships according to claim 24 and wherein said non-visually sensible information includes at least one of the time and geographical location where said composite image was taken and an identification of an album on a social network with which it is associated.

26. A method for mapping interpersonal relationships according to claim 24 and wherein said non-visually sensible information is obtained at least by interfacing with social network APIs to find persons who appeared in other pictures in the same album, or persons that appeared in other albums taken in the same geographical location at the same time.

27. A method for mapping interpersonal relationships according to claim 24 and wherein said list of candidate persons is extended and further prioritized by analyzing relationships of the persons appearing in a relationship map.

28. A method for mapping interpersonal relationships according to claim 1 and wherein said prioritizing employs image attribute filtering.

29. A method for mapping interpersonal relationships according to claim 1 and wherein user feedback confirming that the person whose image is believed to be a given person is or is not that person is employed in generation of a further iterative relationship map.

30. A method for mapping interpersonal relationships according to claim 1 and wherein user feedback confirming that the person whose image is believed to be a given person is or is not that person is employed in improving said face representation.

31. A method for mapping interpersonal relationships according to claim 1 and wherein said searching includes comparison of face representations of persons in said list of candidate persons with face representations of persons in said relationship map.

32. A method for mapping interpersonal relationships according to claim 11 and also comprising searching at least one of said relationship maps.

33. A method for mapping interpersonal relationships according to claim 32 and wherein said searching of said at least one of said relationship maps employs search terms including at least one of uniquely identified persons, an additional image of a person, relationships between various persons, gender and face representations.

34. A method for mapping interpersonal relationships according to claim 32 and wherein said searching of said at least one of said relationship maps employs a user interface.

35. A method for mapping interpersonal relationships according to claim 32 and wherein said searching of said at least one of said relationship maps is carried out via at least one social network having access to said at least one of said relationship maps.

36. A system for mapping interpersonal relationships comprising:
　　processing functionality operative to process a multiplicity of images and contextual information relating thereto including creating and prioritizing a list of a plurality of candidate persons having at least a predetermined relationship with at least one person connected to at least one image, using multi-dimensional information including visually sensible information in said multiplicity of images and contextual information relating thereto, wherein said processing includes facial representation generation performed on an unknown person in at least one image;
　　searching functionality operative to search said list of a plurality of candidate persons based at least in part on said prioritizing to select at least one of said candidate persons as having at least a predetermined relationship with said at least one person; and
　　comparison functionality operative to compare said facial representation with previously generated facial representations of the candidate persons in accordance with and in an order established by said prioritizing, wherein said comparing is terminated and a candidate person is selected when a combined priority/similarity threshold is reached for a given candidate person, said priority/similarity threshold taking into account the similarity of a facial representation of a candidate person to the facial representation of an unknown person, the priority of that candidate person established by the above-referenced prioritizing and the quality of the facial representation of the candidate person.

37. A system for mapping interpersonal relationships according to claim 36 and wherein said searching functionality also employs said multi-dimensional information.

38. A system for mapping interpersonal relationships according to claim 36 and wherein said multi-dimensional information includes:
at least one of
visual information appearing in an image; geographical information appearing in said image; visual background information appearing in said image; images of other persons appearing in said image; and person identifiers appearing in said image; and
at least one of
information relating to an image collection of which said image forms a part;
a time stamp associated with said image;
information not appearing in said image but associated therewith;
geographical information not appearing in said image;
visual background information appearing in another image; and
person identifiers not appearing in said image but otherwise associated therewith.

39. A system for mapping interpersonal relationships according to claim 36 and wherein said multi-dimensional information includes:
at least one of
visual information appearing in an image; geographical information appearing in said image; visual background information appearing in said image; images of other persons appearing in said image; and
person identifiers appearing in said image; and at least two of information relating to an image collection of which said image forms a part;
a time stamp associated with said image;
information not appearing in said image but associated therewith;
geographical information not appearing in said image;
visual background information appearing in another image; and
person identifiers not appearing in said image but otherwise associated therewith.

40. A system for mapping interpersonal relationships according to claim 36 and wherein said multi-dimensional information includes:
at least one of
visual information appearing in an image; geographical information appearing in said image; visual background information appearing in said image; images of other persons appearing in said image; and person identifiers appearing in said image; and
at least three of
information relating to an image collection of which said image forms a part;
a time stamp associated with said image;
information not appearing in said image but associated therewith;
geographical information not appearing in said image;
visual background information appearing in another image; and
person identifiers not appearing in said image but otherwise associated therewith.

41. A system for mapping interpersonal relationships according to claim 36 and wherein said multi-dimensional information includes:
all of the following:
visual information appearing in an image; geographical information appearing in said image; visual background information appearing in said image; a part;
images of other persons appearing in said image;
person identifiers appearing in said image;
information relating to an image collection of which said image forms a part;
a time stamp associated with said image;
information not appearing in said image but associated therewith;
geographical information not appearing in said image;
visual background information appearing in another image; and
person identifiers not appearing in said image but otherwise associated therewith.

42. A system for mapping interpersonal relationships according to claim 36 and wherein said at least one image is a composite image, which includes images of multiple persons, at least one of whom is unknown.

43. A system for mapping interpersonal relationships according to claim 36 and wherein said at least one image is a composite image, which includes images of multiple persons, none of whom are known.

44. A system for mapping interpersonal relationships according to claim 36 and wherein said at least one person connected with said at least one image appears in said image.

45. A system for mapping interpersonal relationships according to claim 36 and also comprising tagging said at least one person connected with said at least one image with a person identifier.

46. A system for mapping interpersonal relationships according to claim 36 and wherein said processing includes iterative generation of relationship maps based on at least visually sensible information and also on additional, non-visually sensible information related to persons who either appear in said at least one image or are otherwise associated therewith.

47. A system for mapping interpersonal relationships according to claim 36 and wherein said non-visually sensible information is meta-data associated with image data.

48. A system for mapping interpersonal relationships according to claim 47 and wherein said meta-data includes data derived from a social network.

49. A system for mapping interpersonal relationships according to claim 47 and wherein said meta-data includes data attached to the image data of said composite image.

50. A system for mapping interpersonal relationships according to claim 46 and wherein said iterative generation of relationship maps starts from a precursor relationship map, containing information on relationships of at least one known person in said at least one image.

51. A system for mapping interpersonal relationships according to claim 46 and wherein said relationship map is also based on inter-personal relationship data received from at least one of a social network and earlier instances of relationship mapping based on analysis of other images.

52. A system for mapping interpersonal relationships according to claim 46 and wherein said relationship map includes an indication of at least strength of the relationship between two persons.

53. A system for mapping interpersonal relationships according to claim 46 and wherein said relationship map includes a face representation which identifies each of the persons in the map.

54. A system for mapping interpersonal relationships according to claim 46 and wherein said relationship map includes an indication of whether each person in the map is a male or female.

55. A system for mapping interpersonal relationships according to claim 54 and wherein said indication of whether each person in the map is a male or female is provided by at least one of a social network and operation of image attribute recognition.

56. A system for mapping interpersonal relationships according to claim 36 and wherein said prioritizing employs an indication of whether a person is a male or female.

57. A system for mapping interpersonal relationships according to claim 36 and wherein said prioritizing employs an indication of whether a person appears in the same album in a social network as another person appears.

58. A system for mapping interpersonal relationships according claim 36 and wherein said processing functionality includes seeking candidate persons having at least a predetermined relationship with a known person in at least one image.

59. A system for mapping interpersonal relationships according to claim 58 and wherein said seeking candidate persons is carried out by starting with the generation of a list of candidate persons who have a temporal association with said known person based on visually-sensible information contained in said at least one image as well as non-visually sensible information.

60. A system for mapping interpersonal relationships according to claim 59 and wherein said non-visually sensible information includes at least one of the time and geographical location where said composite image was taken and an identification of an album on a social network with which it is associated.

61. A system for mapping interpersonal relationships according to claim 59 and wherein said non-visually sensible information is obtained at least by interfacing with social network APIs to find persons who appeared in other pictures in the same album, or persons that appeared in other albums taken in the same geographical location at the same time.

62. A system for mapping interpersonal relationships according to claim 59 and wherein said list of candidate persons is extended and further prioritized by analyzing relationships of the persons appearing in a relationship map.

63. A system for mapping interpersonal relationships according to claim 36 and wherein said prioritizing employs image attribute filtering.

64. A system for mapping interpersonal relationships according to claim 36 and wherein user feedback confirming that the person whose image is believed to be a given person is or is not that person is employed in generation of a further iterative relationship map.

65. A system for mapping interpersonal relationships according to claim 36 and wherein user feedback confirming that the person whose image is believed to be a given person is or is not that person is employed in improving said face representation.

66. A system for mapping interpersonal relationships according to claim 36 and wherein said searching functionality includes comparison functionality operative to provide comparison of face representations of persons in said list of candidate persons with face representations of persons in said relationship map.

67. A system for mapping interpersonal relationships according to claim 46 and also comprising relationship map searching functionality.

68. A system for mapping interpersonal relationships according to claim 67 and wherein said relationship map searching functionality employs search terms including at least one of uniquely identified persons, an additional image of a person, relationships between various persons, gender and face representations.

69. A system for mapping interpersonal relationships according to claim 67 and wherein said relationship map searching functionality employs a user interface.

70. A system for mapping interpersonal relationships according to claim 67 and wherein said relationship map searching functionality is carried out via at least one social network having access to said at least one of said relationship maps.

* * * * *